United States Patent
Hsu et al.

(10) Patent No.: US 6,620,749 B2
(45) Date of Patent: Sep. 16, 2003

(54) LIGHT-WEIGHT BLACK CERAMIC INSULATION

(75) Inventors: Ming-Ta S. Hsu, San Jose, CA (US); Timothy S. Chen, San Jose, CA (US)

(73) Assignee: HC Chem Research and Service Corp., San Jose, CA (US)

( * ) Notice: Subject to any disclaimer, the term of this patent is extended or adjusted under 35 U.S.C. 154(b) by 57 days.

(21) Appl. No.: 09/972,817

(22) Filed: Oct. 9, 2001

(65) Prior Publication Data

US 2002/0025900 A1 Feb. 28, 2002

Related U.S. Application Data

(63) Continuation-in-part of application No. 09/490,677, filed on Jan. 24, 2000, now Pat. No. 6,339,034.

(51) Int. Cl.[7] .............................................. C04B 35/14
(52) U.S. Cl. ........................... 501/80; 501/85; 501/133; 423/338; 252/62
(58) Field of Search ........................... 501/80, 85, 133; 423/338; 252/62

(56) References Cited

U.S. PATENT DOCUMENTS 4,720,532 A * 1/1988 Seyferth et al. .............. 528/28
6,339,034 B1 * 1/2002 Hsu et al. ..................... 501/80

* cited by examiner

*Primary Examiner*—Paul Marcantoni
(74) *Attorney, Agent, or Firm*—James V. Tura

(57) ABSTRACT

Ultra-high temperature, light-weight, black ceramic insulation having a density ranging from about 0.12 g/cc. to 0.6 g/cc. such as ceramic tile is obtained by pyrolyzing siloxane gels derived from the reaction of at least one organo dialkoxy silane and at least one tetralkoxy silane in an acid or base liquid medium. The reaction mixture of the tetra- and dialkoxy silanes also may contain an effective amount of a mono- or trialkoxy silane to obtain the siloxane gels. The siloxane gels are dried at ambient temperatures and pressures to form siloxane ceramic precursors without significant shrinkage. The siloxane ceramic precursors are subsequently pyrolyzed, in an inert atmosphere, to form the black ceramic insulation comprising atoms of silicon, carbon and oxygen. The ceramic insulation can be characterized as a porous, uniform ceramic tile resistant to oxidation at temperatures ranging as high as 1700° C., and particularly useful as lightweight tiles for spacecraft and other high-temperature insulation applications.

17 Claims, No Drawings

LIGHT-WEIGHT BLACK CERAMIC INSULATION

RELATED APPLICATION

This application is a continuation-in-part of application Ser. No. 09/490,677 filed Jan. 24, 2000, now U.S. Pat. No. 6,339,034.

ORIGIN OF INVENTION

The invention described herein was made in the performance of work under a NASA Contracts NAS2-97028 and NAS2-98067 and is subject to Public Law 96-517 (35 U.S.C. §200 et seq.). The contractor has elected to retain title in the invention. The U.S. Government has certain rights in the invention.

BACKGROUND OF INVENTION

1. Field of the Invention

This invention relates to an ultra high-temperature, lightweight ceramic insulation such as porous ceramic tile containing silicon, carbon and oxygen. More particularly, the invention relates to a lightweight, ceramic insulation containing silicon, carbon and oxygen capable of retaining its shape, strength and physical properties when exposed to an oxidizing environment at temperatures as high as 1700° C. More specifically, this invention relates to the sol-gel process of preparing ceramic insulation which comprises an insulation product derived from the reaction of multifunctional silanes to form a small-pore, wet siloxane gel followed by drying the gel at ambient pressures with limited shrinkage and, subsequently heating or pyrolyzing the dried gel, in an inert atmosphere, to form the high-temperature, lightweight ceramic insulation.

An important use for the insulation of this invention includes, for example, the space vehicles, such as the space shuttle which leaves and reenter the earth's atmosphere and therefore requires exterior thermal insulation. The operation of the space shuttle requires the development of lightweight and thermally efficient exterior insulation capable of withstanding a variety of environments. During reentry into the earth's atmosphere, the insulation must maintain the vehicle's exterior structure below 175° C. while experiencing substantial aeroconvective thermal environments which heat the surface of the insulation to temperatures in excess of 1,000° C. In space, the thermal protection must insulate the vehicle from the cold (e.g., -70° C.) experienced while in orbit. In addition to thermal and aeroconvective environments, the insulation must be able to withstand the mechanical stress associated with launch vibrations, acoustics, structural movement of the surface of the vehicle, and the landing impact.

The use of state-of-the art thermal insulation, lightweight ceramic tiles, developed by Lockheed (LI-900), and NASA/Ames Research Center (AETB, AIM, FRCI, etc.), are all limited to temperatures of use at about 1300° C. in an oxidizing environment. For applications which experience temperatures above 1300° C., a dense ceramic insulation must be used which adds a substantial weight penalty. Presently, the thermal insulation used for protecting space vehicles includes both the rigid and flexible ceramic insulation with a carbon composite being used on the leading edges of the vehicle. However, these ceramic carbon composites must be very porous in order to maintain the weight at a reasonable low level. This can be accomplished by using the ultrahigh-temperature, stable, lightweight ceramic insulation of this invention.

2. Description of the Prior Art

In general, low-density insulations are required to thermally protect the structure of the Space Shuttle from the high temperatures normally encountered during atmospheric entry. The material developed for the Shuttle was, a rigidized fibrous insulation, called reusable surface insulation (RSI). Its density and conductivity were optimized (minimum conductivity and weight) to keep the thermal protection system weight as low as possible, consistent with adequate mechanical properties to increase the resultant payload capability of the vehicle. A characteristic of a successful insulation is the high-thermal shock resistance, required to survive the rapid temperature changes and high thermal gradients normally incurred during entry. The temperature limitation of the prior materials and the desirability to improve the mechanical properties of these materials are the reasons to develop alternate materials. There is a need to develop alternate insulation systems for advanced earth-entry vehicles. These needs are relative to the state-of-the-art materials and include improved mechanical properties, higher-temperature capability, equivalent thermal shock resistance, low-thermal conductivity, and adequate morphological stability. Presently, composite insulating materials intended for use on orbital reentry vehicles, such as the Space Shuttle, consist of a coating in combination with low density insulation substrates. Examples of these composites and their use are provided in U.S. Pat. No. 4,148,962, issued Apr. 10, 1979; U.S. Pat. No. 3,955,034, issued May 4, 1976, and U.S. Pat. No. 4,612,240, issued Sept. 16, 1986.

More specifically, details regarding prior ceramic insulations are disclosed in various other U.S. patents. For example, U.S. Pat. No. 5,618,766 discloses lightweight ceramic compositions comprising a porous carbon preform. The carbon preform contains a tetralkoxy silane, a dialkoxy silane and a trialkyl borate. U.S. Pat. No. 4,713,275 relates to a ceramic tile for use in a thermal protection system, employing a ceramic cloth having additional ceramic material deposited therein. U.S. Pat. No. 4,804,571 relates to a thermal protection system for reentry vehicles or high speed aircraft including multiple refractory tiles of varying thickness defined by thermal requirements at the point of installation. U.S. Pat. No. 4,100,322 relates to a high thermal capacity fiber-resin-carbon composite having a polymer resin filler. The composite is prepared by impregnating a woven fabric of carbon or graphite yarn with a resin, curing the resin, pyrolyzing the impregnated fabric and re-impregnating the resulting fiber-porous carbon char composite with resin. U.S. Pat. No. 4,605,594 relates to a ceramic article including a woven ceramic cloth having a non-porous core and a porous periphery prepared by treating with an acid. The porous periphery can be infiltrated with materials such as metal, a metal oxide, a catalyst and an elastomer. The articles can be used as fiber optic elements, catalyst supports and heat resistant tiles for aerospace purposes. U.S. Pat. No. 3,533,813 relates to a low density, nonstructural ceramic employing a porous ceramic support in combination with organic fillers. The process includes burning off the organics to form pores within the ceramic. This process reduces the mass of the composite, thereby reducing its density while maintaining inherent strength.

Further, it is generally known in the art that a gel consists of a tenuous solid skeleton immersed in liquid. When the liquid is supercritically extracted in an autoclave, the skeleton is called an aerogel, and the volume formerly occupied by liquid becomes porosity. If the wet gels are dried at ambient pressure, the gels shrink to a small dry gel with higher density. Silica aerogels are porous, and are very good insulation materials, prepared from wet gels (alcogels) by the supercritical drying method. U.S. Pat. No. 4,327,065 describes the method of preparing silica aerogel. The preparation is effected by means of hydrolysis of a tetraalkoxysilane in an alcohol, in the presence of a catalyst for the formation of an alcogel which is aged and washed with alcohol to remove water. The alcogel is thereafter treated in an autoclave by means of a temperature increase to above the critical point of the alcohol, isothermic pressure drop by means of the release of alcohol vapor, and then a temperature drop. U.S. Pat. No. 4,610,863 describes an improved supercritical drying process for forming silical aerogel. The improvement includes the additional step, after alcogels are formed, of substituting a solvent, such as $CO_2$, for the alcohol in the alcogels, the solvent having a critical temperature less than the critical temperature of the alcohol. The resulting gels are dried at a supercritical temperature for the selected solvent, such as $CO_2$.

SUMMARY OF THE INVENTION

In comparison to the prior art, this invention relates to lightweight, high-temperature black ceramic insulation comprising atoms of silicon, carbon and oxygen derived from the reaction of at least one organodialkoxy silane and at least one tetraalkoxy silane to form a siloxane gel in the presence of a catalyst in a liquid medium such as alcohol. In addition, the reaction mixture can include effective amounts of at least one alkyl trialkoxy silane and/or a monoalkoxy silane. More particularly, the invention relates to an oxidation resistant, black ceramic insulation material containing silicon, carbon and oxygen and to the method of preparing a ceramic insulation e.g. ceramic tile capable of retaining its shape and strength when exposed to an oxidizing environment at temperatures ranging up to about 1700° C. The method results in a unique product derived from the reaction of at least one dialkoxy silane and at least one tetraalkoxy silanes such as the di- and tetra-functional silanes to form wet alcogels, in the presence of a catalyst in a liquid medium followed by drying the alcogel at ambient pressures and subsequently heating or pyrolyzing the dried gel, in an inert atmosphere, to temperatures ranging from about 900° C. to 1500° C. to form the ceramic insulation.

The preferred di- and tetra-functional alkoxides are the silicon alkoxides having di- and tetra-oxygen functionality wherein the silicon alkoxides have two and four Si—O bonds, respectively. The silanes particularly useful in the practice of this invention include a combination of silanes with tetra- and di-oxygen functionality of the general formula $Si(R^1O)_4$ and $(R^2O)_2$—Si—$R^4R^3$ wherin $R^1$ and $R^2$ are the same or different and represent saturated or unsaturated alkyl groups or radicals of 1–12 carbons and wherein $R^4$ and $R^3$ are different or the same as $R^1$ and $R^2$. Preferably the radicals $R^4$ and $R^3$ are the same or different radicals of 1 to 8 carbons e.g. 1–6 carbons and include the alkyl, alkenyl, aryl, alkaryl, and aralkyl radicals. One of the $R^4$ or $R^3$ can be hydrogen. The radicals can be hydrocarbon groups i.e. (—CH) of carbon and hydrogen and include the straight or branched chains, and the saturated or unsaturated radicals of 1 to 12 carbons. In general, the number of carbon atoms in the hydrocarbon groups range from 1–8 and more preferably from 1–4 carbons.

Gelation of the mono-, tri-, di- and tetraalkoxy silanes is catalyzed by the addition of catalytic amounts of a water soluble acid or base, such as a mineral acid i.e. $H_2NO_3$, $H_2SO_4$, HCl, or a base such as KOH, NaOH, $NH_3$, ammonium hydroxide or a water soluble amine and various other known water soluble acids or bases. In addition to water or aliphatic alcohols and mixtures thereof, in some applications it may be appropriate to use additional solvents that are either water-soluble or dispersible as the liquid reaction media such as acetone or any other such solvent. These solvents would expedite fast drying and serve to dilute or further liquefy the siloxane gel to control the density of the dry gel.

In the instant process, the siloxane gel is dried prior to pyrolysis at ambient pressures without using an expensive autoclave. The dried gel will not shrink, significantly, if the reaction time and the ratio of the reagents are controlled. A ceramic tile is formed by pryolyzing or heating the dried sponge gel, in an inert atmosphere i.e. an inert gas at temperatures ranging up to about 1500° C. e.g. preferably from 900° C. to 1300° C. When a high pyrolyzing temperature is used, e.g. ranging up to 1500° C., the time required for pyrolyzation is substantially decreased. However, where there is need for lower production costs, the lower temperatures can be used for longer periods. This may be particularly important for a very large substrate because very large baking ovens tend to have a lower maximum temperature. Moreover, when the dried gel is relatively thick, the time required for uniform pyrolyzation throughout the entire monolith will require more extended periods of heating. This will be easily ascertained by one of ordinary skill in the art. A large monolith may require several days of treatment for the center regions of the gel to be fully pyrolyzed. The molar ratio of the silicon, oxygen and carbon atoms in the reaction product (siloxane) is determined by the molar ratio of the di- and teralkoxy silanes in the reaction and in some instances by the molar ratio of the tetralkoxy silane and the carbon content of the Si—C bonds in the dialkoxy silanes.

The lightweight, oxidation resistant, ceramic insulation or tiles of this invention, useful in advance space vehicles, are made by forming the gel followed by drying and subsequent pyrolysis. Specifically, this invention is directed to a process of preparing an oxidation-stable, high temperature, porous ceramic insulation e.g. tiles which comprises reacting, in a liquid medium, effective amounts of (a) at least one tetraalkoxy silane having the formula:

$$Si(OR^1)_4$$

wherein $R^1$ is a saturated or unsaturated organic radical having 1 to 12 carbons with (b) effective amounts of at least one dialkoxy silane having the formula:

$$(R^2O)_2\text{—Si—}R^4R^3$$

wherein $R^2$ is a saturated or unsaturated organic radical having 1 to 12 carbons and $R^4$ and $R^3$ are saturated or unsaturated, either the same or different organic radicals having 1 to 12 carbons to obtain a siloxane gel drying said siloxane gel and (c) subsequently pyrolyzing the siloxane gel in an inert atmosphere at temperatures ranging up to about 1500° C. to produce the porous ceramic insulation. The reaction ratio of the tetraalkoxy silane to the dialkoxy silane ranges from about 1.0 part by weight of the tetraalkoxy silane to about 0.1 to 2.0 and preferably 0.7 to 1.5 parts by weight of the dialkoxy silane.

The reaction between the tetraalkoxy silane and the dialkoxy silane may contain at least one alkyl trialkoxy silane having the formula:

$$R^5\text{—Si}(OR^6)_3$$

wherein $R^5$ is a saturated or unsaturated alkyl radical of 1 to 12 carbons and $R^6$ is either the same or a different alkyl radical having 1 to 12 carbons. The reaction between the tetraalkoxy silane and the dialkoxy silane may also contain at least one alkyl monoalkoxy silane having the formula:

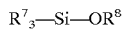

wherein $R^7$ is a saturated or unsaturated alkyl radical of 1 to 12 carbons and $R^8$ is either the same or different alkyl radical of 1 to 12 carbons. Where the $R^4$ and $R^3$ alkyl radicals of the dialkoxy silane have 1–4 carbons, the ratio in the reaction mixture is about 1.0 part by weight of the tetraalkoxy silane to about 0.1 to 2.0 part by weight of the dialkoxy silane to about 0.01 to 0.5 parts by weight of the trialkoxy silane. Where the $R^7$ and $R^8$ are alkyl radicals of 1–4 carbons, the ratio in the reaction mixture is about 1.0 part by weight of the tetraalkoxy silane to about 0.1 to 2.0 parts by weight of the dialkoxy silane to about 0.01 to 0.5 parts by weight of the alkyl monoalkoxy silane.

The oxidation-stable, high temperature, porous ceramic insulation materials of this invention can be characterized as being derived from pyrolyzed siloxane gels consisting essentially of silicon, carbon, and oxygen in the mole ratios of about 1.0 mole of silicone, to about 0.1 to 1.0 mole of carbon to about 0.8–2.0 moles of oxygen. This ceramic insulation is further characterized as having black particle sizes ranging from about 1.0 to 50 um., void sizes ranging from about 10 to 100 um. and is capable of retaining its insulation and other physical properties at temperatures ranging up to about 1700° C.

Accordingly, it is an object of this invention to provide high temperature, lightweight ceramic insulation for use at temperatures as high as 1700° C.

It is another object of this invention to provide a method of preparing high temperature, lightweight ceramic insulation derived from the reaction of alkoxy silanes containing silicon, oxygen and carbon for use on nuclear reactors, spacecraft nose tips, and various other leading edges.

It is another object of this invention to provide ceramic insulation tile having high-temperature characteristics, lightweight, high tensile strength and capable of being formed into any desired shape.

It is a further object of this invention to provide ceramic insulation tile comprising siloxanes derived from the reaction of alkoxy silanes including the mono-, di-, tri-, and tetraalkoxy silanes, and preferably from the reaction of dialkoxy silanes and tetralkoxy silanes, for use on space vehicles and other insulation applications, having improved high temperature characteristics, lightweight i.e. density ranging from about 0.12 g/cc. to 0.6 g/cc. and high-tensile strength.

These and other objects of this invention will become apparent from a further and more detailed description of the invention as follows.

DETAILED DESCRIPTION OF THE INVENTION

This invention relates to black oxidation-resistant, lightweight amorphous high-temperature ceramic insulation having a density ranging from about 0.12 g/cc. to 0.6 g/cc., and preferably from about 0.16 g/cc. to 0.4 g/cc. comprising silicon, carbon and oxygen atoms and to the method for preparing said insulation which comprises the formation of a siloxane gel derived from the reaction of di- and tetraalkoxy silanes in a liquid medium such as water and/or alcohol to form a siloxane gel, followed by drying the gel at ambient pressure, without using an autoclave, and subsequently heating or pyrolyzing the dried sponge gel, in an inert atmosphere, to form the black ceramic insulation. In one embodiment, the siloxane gel in various amounts of alcohol and water is dried at ambient pressure to form a ceramic siloxane precursor. The ceramic siloxane precursor is subsequently pyrolyzed, in an inert atmosphere i.e. inert gas, to form the black ceramic insulation of this invention. The insulation is characterized as having limited shrinkage in size, shape and configuration and is stable at ultra-high temperatures. Various amounts of solvent i.e. water, alcohol and mixture thereof in any ratio can be used to achieve the desired density and strength of the high-temperature oxidation-stable ceramic insulation.

For purposes of this invention, the preferred di- and tetrafunctional alkoxide reactants include the alkoxides of silicon having two and four Si—O bonds, respectively. Particularly preferred silanes comprise a combination of silanes with tetra- and dioxygen functionality having the general formula $Si(OR^1)_4$ and $(R^2O)_2$—Si—$R^4R^3$ wherein $R^1, R^2, R^3$ and $R^4$ are the same or different and represent organic radicals of 1–12 carbons such as an alkyl, alkenyl, aryl or substituted radical of 1 to 12 carbons such as an alkyl, aryl or substituted radical of 1 to 8 carbons. The term hydrocarbons comprise carbon and hydrogen (—CH) which may be straight or branched chain, saturated or unsaturated radicals. In general, the number of carbon atoms in the hydrocarbon or organo groups range from 1–12 and preferably from 1–8 and more preferably 1–4 carbons e.g. 1–2 carbons. The $R^1$, $R^2$, $R^3$, and $R^4$ groups of the above formulae are preferably lower alkyl groups, e.g. 1 to 8 carbons such as methyl, ethyl, propyl, isopropyl, butyl, isobutyl, pentyl, hexyl, heptyl, etc., the isomers, and mixtures thereof and include the alkenyl or vinyl unsaturated groups such as vinyl, divinyl, propenes, butenes, etc. and various mixture thereof in various ratios.

Specific examples of some of the preferred silanes useful for preparing the siloxane gels of this invention include the tetraalkoxy silanes such as tetramethoxy silane or tetraethoxy silane. Some of the preferred dialkoxy silanes include the diethyldiethoxy silane $(C_2H_5)_2Si(OC_2H_5)_2$, diethyldibutoxysilane $(C_2H_5)_2Si(OC_4H_9)_2$, dimethyldiethoxy silane $(CH_3)_2Si(OC_2H_5)_2$, dimethyldimethoxy silane $(CH_3)_2Si(OCH_3)_2$, diphenyldimethoxy silane $(C_6H_5)_2Si(OCH_3)_2$, vinylmethyldiethoxy silane $(CH_2:CH)(CH_3)Si(OC_2H_5)_2$ and various combination thereof in any ratios.

The siloxane sol-gels of this invention are prepared by reacting the alkoxy silanes in the presence of an aqueous catalyst (up to about 10% e.g. 0.1 to 2.0% by weight of the liquid medium) in an aqueous-alcohol or alcohol medium. The weight ratio between the dialkoxy silane and the tetraalkoxy silane ranges from about 1.0 part by weight of the tetraalkoxy to 0.1 to 2.0 part by weight of the dialkoxy silane, and preferably from about 0.7 to 1.5 parts by weight. The alcohol media insures that a homogeneous sol-gel is obtained. While it is convenient to use the lower alcohols such as ethanol, other lower aliphatic alcohols of 1 to 8 carbons e.g. 1 to 4 carbons may be used alone or in admixture in any ratio. Examples of the preferred alcohol media include methanol, ethanol propanol, isopropanol, butanol, sec- and isobutanol, pentanol, and any mixture of the lower alcohols alone or with water in any ratio. Although the siloxane sol may be gelled by aging at ambient temperatures or by heating, it is preferred to catalyze gelation by the addition of a catalytic amount e.g. 0.1 to 2.0% by weight of a dilute mineral acid e.g. $HNO_3$, HCl, etc. or a base such as NaOH, KOH, ammonium hydroxide or a low molecular weight amine etc. to the reaction mixture. Mineral acids such as nitric acid or a base such as ammonium hydroxide are particularly useful as gelling agents. Gelation will occur at ambient conditions, but heating to temperatures of from about 40°–90° C. is preferred also in addition to the use of the acid or base catalyst. After gelation, the gel is dried in an oven or at ambient conditions to form the siloxane precursor. Vacuum drying (e.g., overnight at 70°–100° C.) is not necessary to insure that the gel does not shrink, significantly, prior to pyrolyzing the gel in an inert atmosphere.

In addition, the reaction mixture of this invention may contain small but effective amounts of at least one mono- or trialkoxy silane in combination with the di- and tetraalkoxy silanes, in the ratios of about 1.0 part by weight of the tetraalkoxy silane to about 0.1 to 2.0 part by weight of the dialkoxy silane to about 0.01 to 1.0 part by weight of the trialkoxy silane or to about 0.01 to 1.0 part by weight of the monoalkoxy silane. The tri- and monoalkoxy silanes used in combination with the tetra- and dioxygen functionality silanes have the general formula $R^5$—Si—$(OR^6)_3$ and $R^7_3$—Si—$OR^8$ wherein $R^5$, $R^6$, $R^7$ and $R^8$ are the same or different and represent organic radicals of 1–12 carbons. The number of carbon atoms in the hydrocarbon or organo groups range from 1–12 and preferably from 1–8 and more preferably 1–4 carbons or 1–2 carbons. The $R^5$, $R^6$, $R^7$, $R^8$, organic groups of the above formulae are preferably lower alkyl radicals e.g. 1 to 8 carbons such as methyl, ethyl, propyl, isopropyl, butyl, isobutyl, pentyl, hexyl, heptyl or octyl, the isomers, and mixtures thereof including the alkenyl or vinyl unsaturated groups such as vinyl, divinyl, propenes, butenes, etc. and various mixture thereof. Some specific examples of the mono- and trialkoxy silanes useful for preparing the siloxane gels of this invention include the alkyltrialkoxy silanes such as methyl trimethoxy silane $CH_3Si(OCH_3)_3$, ethyltrimethoxy silane $C_2H_5Si(OCH_3)_3$, methyltriethoxy silane $CH_3Si(OC_2H_5)_3$ and various monalkoxy silanes such as trialkylethoxy silanes and trialkylmethoxy silanes etc.

The ceramic insulation is formed by heating the dried sponge white siloxane gel at temperatures ranging up to about 1500° C. in an inert atmosphere. The inert atmosphere includes a vacuum or an atmosphere of one or more of the inert gasses, such as argon, nitrogen, helium etc. In order to increase the strength of the ceramic insulation, after pyrolysis, the ceramic insulation or tile can be further fired at temperatures up to about 1500° C. for about 10–60 min in air. To further increase the density and strength of the final ceramic insulation another embodiment of this invention includes repeating the above process for up to three times. This multiple processing technique gives the advantage of tailoring the insulation to specific anticipated heat-range challenges, and impact strength. For instance, a very-high impact resistant, but relatively-high density insulation tile, can be provided for the nose cone area of the vehicle, but tiles of lower impact resistance and a much lower density can be provided for the rear and sides of the re-entry vehicle. This procedure allows for a less expensive production and minimal weight loading. For more commercial implementations, such as firewalls, nuclear power facility safety walls, vulcanological applications, and other high temperature applications, similar tailoring can be achieved using this procedure.

In accordance with this invention, the insulation is obtained by the reaction of the tetraalkyoxy silanes with the alkyldialkyoxy silanes in the presence of an acid or base catalyst in a liquid medium such as alcohol and water to form the siloxane gel which is subsequently pyrolyzed. The reaction of the silanes is illustrated by the following formula:

Chemical reaction of tetraalkoxy silanes with dialkoxy silanes:

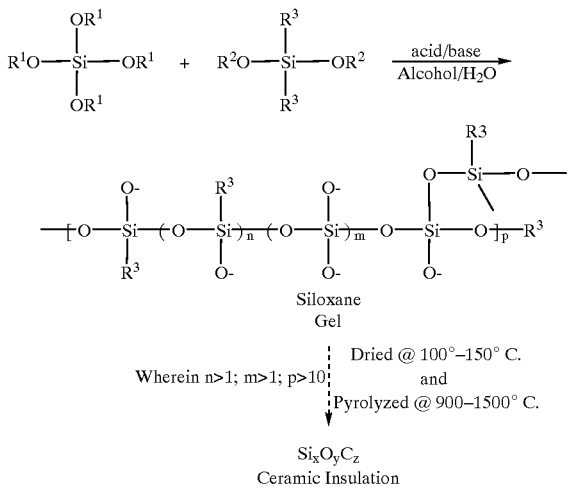

The wet gel is a clear siloxane gel containing atoms of silicon, carbon, hydrogen and oxygen. After drying at about 100° C. and pyrolyzing at temperatures ranging up to about 1500° C., in an inert environment, the gel becomes a black ceramic insulation comprising silicon, oxygen and carbon. This product was found to be stable in an oxidizing environment at temperatures as high as 1700° C. It was found that the reaction of the alkoxy silanes which formed the siloxane gel, dried at ambient pressure with limited shrinkage, and when pyrolyzed in an inert environment, resulted in black insulation having improved high-temperature characteristics, light-in-weight e.g density ranging from about 0.12 g/cc. to 0.6 g/cc., with high-tensile strength and could be formed into the desired shape for various end uses.

The following Examples illustrate the preparation of the ceramic insulation materials e.g. ceramic insulation tiles in accordance with the process of this invention.

EXAMPLE 1

Tetramethoxysilane (2.0 g) and dimethyldimethoxysilane (1.0 g) were mixed with 4.0 g of methanol and stirred. After adding 0.5g. 1.0 N of ammonium hydroxide, the siloxane gel formed within 60 min. One piece of the air-dry gel was pyrolyzed at 1200° C. in argon for one hour. This black ceramic insulation was stable at 1600° C. in air.

EXAMPLE 2

Tetraethoxysilane (2.0 g) and dimethyldiethoxysilane (1.0 g) were mixed with 6.0 g of ethanol and stirred. After adding 0.5 g of 0.5 N of sodium hydroxide, the siloxane gel formed within two hours. The air-day gel was pyrolyzed at 1000° C. for one hour. This black ceramic insulation tile was stable at 1700° C. in air.

EXAMPLE 3

Tetraethoxysilane (2.0 g) and dimethyldimethoxysilane (0.8 g) were mixed together with 5.0 g of ethanol. After several hours, 0.5 g of 0.5 N of ammonium hydroxide was added to the reaction and a gel formed within two hours. The air-dry gel was heated at 1300° C. in argon. The resultant black ceramic insulation was stable at 1700° C. in air.

EXAMPLE 4

Tetramethoxysilane (2.0 g) and dimethydiethoxysilane (1.5 g) were mixed together with 6.0 g of ethanol and stirred for several hours. After adding 0.5 g of 0.5 N sodium hydroxide, a siloxane gel was formed. Pyrolyzing the air-dry gel at 1100° C. in argon resulted in a black ceramic insulation tile which was stable at 1700° C. in air.

EXAMPLE 5

Tetramethoxysilane (2.0 g), methyldimethoxysilane (0.5 g) and methyltrimethoxysilane (1.0 g) were mixed with 6.0 g of methanol and stirred at room temperature. After adding 0.5 g of 1.0 N of ammonium hydroxide, a siloxane gel was formed within 60 min. One piece of the air-dry gel was pyrolyzed at 1200° C. in argon for one hour. This black ceramic insulation was stable at 1600° C. in air.

EXAMPLE 6

Tetraethoxysilane (2.0 g), dimethyldiethoxysilane (1.0 g) and trimethylethoxysilane (0.1 g) were mixed with 5.0 g of ethanol and 0.1 g of 0.1 N nitric acid under stirring for 1–20 hours. After adding 1.0 g of 1.0 N of ammonium hydroxide to the reaction mixture, a siloxane gel was formed within 60 min. Once piece of the air-dry gel was pyrolyzed at 1100° C. in argon for one hours. This black ceramic was stable at 1600° C. in air.

It is understood that various other embodiments and modifications in the practice of the invention will be apparent and can be made by those skilled in the art without departing from the scope and spirit of the invention as set forth in the appended claims.

What is claimed is:

1. An oxidation-stable, high temperature, porous ceramic insulation obtained by reacting effective amounts of (a) at least one tetraalkoxy silane having the formula:

$$Si(OR^1)_4$$

wherein $R^1$ is a saturated or unsaturated organic radical having 1 to 12 carbons and (b) at least one dialkoxy silane having the formula:

$$(R^2O)_2\text{—}Si\text{—}R^4R^3$$

wherein $R^2$ is a saturated or unsaturated organic radical having 1 to 12 carbons and $R^4$ and $R^3$ are saturated or unsaturated, either the same or different organic radicals having 1 to 12 carbons to obtain a siloxane gel (c) subsequently drying and pyrolyzing the siloxane gel in an inert atmosphere at temperatures ranging from about 900° C. to 1500° C. to produce the porous ceramic insulation having a density ranging from about 0.12 g/cc. to 0.6 g/cc.

2. The insulation of claim 1 wherein the reaction ratio of the tetraalkoxy silane to the dialkoxy silane is about 1.0 part by weight of the tetraalkoxy silane to about 0.1 to 2.0 parts by weight of the dialkoxy silane.

3. The insulation of claim 2 wherein the reaction ratio of the tetraalkoxy silane to the dialkoxy silane is about 1.0 part by weight of the tetraalkoxy silane to about 0.7 to 1.5 parts by weight of the dialkoxy silane, and the siloxane gel is dried at temperatures ranging from about 100° C. to 150° C.

4. The insulation of claim 2 wherein $R^1$ and $R^2$ are alkyl radicals of 1 to 8 carbons and $R^4$ and $R^3$ are alkyl radicals of 1 to 8 carbons.

5. The insulation of claim 2 wherein $R^1$, $R^2$, $R^3$, and $R^4$ are alkyl radicals of 1 to 4 carbons.

6. The insulation of claim 2 wherein the reaction is in a liquid medium comprising alcohol.

7. The insulation of claim 2 wherein the reaction is in a liquid medium comprising water.

8. The insulation of claim 7 wherein the liquid medium comprises a mixture of alcohol and water wherein the ratio of water to alcohol is about 1.0 part by weight of water to 1–100 parts by weight of alcohol.

9. The insulation of claim 8 wherein the alcohol comprises at least one aliphatic alcohol having 1 to 8 carbons.

10. The insulation of claim 8 wherein the mixture of alcohol and water contains an effective amount of catalyst.

11. The insulation of claim 10 wherein the catalyst is an acidic catalyst.

12. The insulation of claim 10 wherein the catalyst is a basic catalyst.

13. The insulation of claim 1 wherein the reaction between the tetraalkoxy silane and the dialkoxy silane contains effective amounts of at least one alkyl trialkoxy silane having the formula:

$$R^5\text{—}Si(OR^6)_3$$

wherein $R^5$ is a saturated or unsaturated alkyl radical of 1 to 12 carbons and $R^6$ is an alkyl radical of 1 to 12 carbons.

14. The insulation of claim 1 wherein the reaction between the tetraalkoxy silane and the dialkoxy silane contains at least one alkyl monoalkoxy silane having the formula:

$$R^7_3\text{—}Si\text{—}OR^8$$

wherein $R^7$ is a saturated or unsaturated alkyl radical of 1 to 12 carbons and $R^8$ is an alkyl radical of 1 to 12 carbons.

15. The insulation of claim 13 wherein $R^5$ and $R^6$ are alkyl radicals of 1–4 carbons and the ratios in the reaction mixture are about 1.0 part by weight of the tetraalkoxy silane to about 0.1 to 2.0 part of weight of the dialkoxy silane to about 0.01 to 0.5 part by weight of the trialkoxy silane.

16. The insulation of claim 14 wherein $R^7$ and $R^8$ are alkyl radicals of 1–4 carbons and the ratios in the reaction mixture are about 1.0 part by weight of the tetraalkoxy silane to about 0.1 to 2.0 part by weight of the dialkoxy silane to about 0.01 to 0.5 part by weight of the alkyl monoalkoxy silane.

17. An oxidation-stable, high temperature, porous ceramic insulation derived from pyrolyzed siloxane gel consisting essentially of silicone, carbon, and oxygen in the mole ratios of about 1.0 mole of silicone, about 0.1–1.0 moles of carbon and about 0.8–2.0 moles of oxygen; said ceramic insulation having particle sizes ranging from about 1.0 to 50 um., a void size ranging from about 10 to 100 um. a density ranging from about 0.12 g/cc. to 0.6 g/cc. and characterized as retaining its insulation and physical properties at temperatures ranging up to about 1700° C.

* * * * *